J. MURPHY.
MANUFACTURE OF RIVETED WATER-PROOF HOSE.

No. 186,492. Patented Jan. 23, 1877.

UNITED STATES PATENT OFFICE.

JOHN MURPHY, OF NEW YORK, N. Y.

IMPROVEMENT IN MANUFACTURE OF RIVETED WATER-PROOF HOSE.

Specification forming part of Letters Patent No. 186,492, dated January 23, 1877; application filed August 14, 1876.

*To all whom it may concern:*

Be it known that I, JOHN MURPHY, of the city, county, and State of New York, have invented certain new and useful Improvements in the Manufacture of Rubber-Lined Riveted Hose and Tubing; and do hereby declare that the following is a full, clear, and exact description thereof, which will enable others skilled in the art to which it appertains to make and use the same, reference being had to the accompanying drawings, and to the letters of reference marked thereon, which form a part of this specification, in which—

Figure 1:
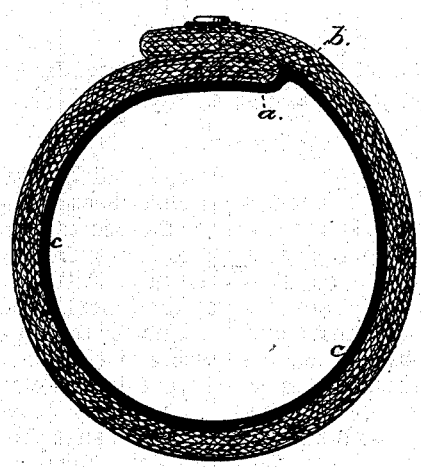
Figure 2:
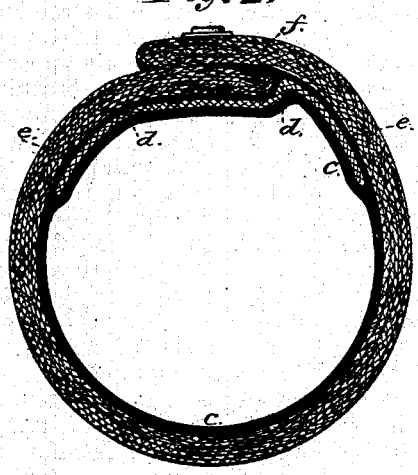

Figure 1 represents a cross-section of ordinary riveted cotton hose, drawn on an enlarged scale, so as to show wherein it differs from my invention. Fig. 2 shows a cross-section of the riveted hose with my improvements, also drawn on an enlarged scale.

Riveted cotton hose, when subjected to heavy pressure, will invariably commence to leak along the seam, for two reasons: first, the ordinary manner of lining with india-rubber the interior of the cotton hose is to insert a rubber tube into it, and to expand and cure the same by admitting steam into the interior of the tube. In this process that portion of the rubber tube which passes around the edge of the inner lap of the cotton hose— namely, (referring to Fig. 1,) that portion which extends from point marked $a$, on the inner lap, to a point marked $b$, must be unduly stretched and become so thin as to be easily broken in the corner when the pressure is given; second, because the rivets elongate the holes in the cotton through which they pass, and the rubber lining will be forced into the enlarged holes and broken through by the pressure of the water.

To remedy both these faults, I make the inner rubber lining in the following manner: I first prepare an ordinary rubber tube, $c$, cement a strip of cloth, $d$, upon it, throughout its whole length, of such a width as to cover about one-third of its circumference, and this strip again I cover with a thin strip of green rubber sheet, $e$, then insert the so-formed and re-enforced tube into the cotton hose, taking care, however, that the re-enforced portion of the tube will cover the rivets and the edge of the inner lap, as shown in Fig. 2.

I prefer to make the re-enforcing-strip $d$ of pieces of cloth cut bias, so as to give the said strip a limited elasticity.

Another improvement is also shown in Fig. 2. It consists of a strip of green rubber sheet, $f$, which I place between the laps of the cotton hose while being riveted, behind the rivets. In curing the hose this strip will be firmly connected to the laps, make the seam strong, and prevent, to some degree, the elongation of the holes under pressure.

If the re-enforcing-strip $d$ be placed opposite the point between $a$ $b$ only, it will prevent the stretching and weakening of the lining at that point simply, and so, if it be placed only opposite to the rivets, it will but prevent the breaking at that point; and while it performs the function ascribed to it if used at either of these two points, yet I prefer to use it at both points.

Having thus described my invention, what I claim, and desire to secure by Letters Patent of the United States, is—

1. In a riveted hose, the intermediate re-enforcing-strip $d$, interposed between the lining and body of the hose, and opposite either the rivets or inner lap of the hose, or both, substantially as set forth.

2. In a riveted hose, the combination, with the body and lining of the hose, of the intermediate re-enforcing strip $d$, and rubber sheets $e f$, substantially as set forth.

In testimony that I claim the foregoing as my own I affix my signature in presence of two witnesses.

JOHN MURPHY.

Witnesses:
BENJN. P. SMITH,
H. W. HEWITT.